United States Patent
Cheng

(10) Patent No.: US 9,684,416 B2
(45) Date of Patent: Jun. 20, 2017

(54) IMAGE SENSOR

(71) Applicant: PixArt Imaging Inc., Hsin-Chu (TW)

(72) Inventor: Hsin-Chi Cheng, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 15/168,226

(22) Filed: May 30, 2016

(65) Prior Publication Data

US 2016/0274734 A1    Sep. 22, 2016

Related U.S. Application Data

(63) Continuation-in-part of application No. 14/160,572, filed on Jan. 22, 2014, now Pat. No. 9,395,847.

(30) Foreign Application Priority Data

Apr. 9, 2013    (TW) .............................. 102112540 A

(51) Int. Cl.
*G06F 3/042*    (2006.01)
*G06F 3/041*    (2006.01)

(52) U.S. Cl.
CPC ............ *G06F 3/0428* (2013.01); *G06F 3/042* (2013.01); *G06F 3/0416* (2013.01)

(58) Field of Classification Search
CPC ....... G06F 3/0428; G06F 3/042; G06F 3/0416
See application file for complete search history.

(56) References Cited

U.S. PATENT DOCUMENTS

| | | | |
|---|---|---|---|
| 5,499,098 A | 3/1996 | Ogawa | |
| 2006/0087565 A1 | 4/2006 | Okamoto | |
| 2006/0119903 A1 | 6/2006 | Chiba | |
| 2008/0095459 A1 | 4/2008 | Vitsnudel | |
| 2008/0239116 A1* | 10/2008 | Smith | H04N 5/2254 348/250 |
| 2009/0219424 A1 | 9/2009 | Sonoda | |
| 2009/0316010 A1 | 12/2009 | Nomura | |
| 2010/0295980 A1* | 11/2010 | Chan | G06F 3/0428 348/308 |
| 2012/0147209 A1* | 6/2012 | Hiraoka | H04N 5/37455 348/222.1 |
| 2013/0120626 A1 | 5/2013 | Chan | |

FOREIGN PATENT DOCUMENTS

TW    201042521    12/2010

* cited by examiner

*Primary Examiner* — Ilana Spar
*Assistant Examiner* — Mihir K Rayan
(74) *Attorney, Agent, or Firm* — Winston Hsu

(57) ABSTRACT

Disclosed is an image sensor comprising: an image sensing unit array, for sensing an object and comprising a plurality of image sensing units arranged in a sensing matrix with M rows and N columns; an image data reading circuit, for reading and outputting image data caught by at least part of the image sensing units; and a control unit for controlling the image data reading circuit to read image data for a reading region in the sensing matrix. The image sensor further comprises a buffer for storing the image data. A number for the buffer rows of the buffer can be smaller than a number for the buffer columns of the buffer to reduce the buffer size.

5 Claims, 15 Drawing Sheets

IMAGE SENSOR

CROSS REFERENCE TO RELATED APPLICATIONS

This application is a continuation-in-part application of applicant's earlier application Ser. No. 14/160,572, filed 2014 Jan. 22, and is included herein by reference.

BACKGROUND OF THE INVENTION

1. Field of the Invention

The present invention relates to an image sensor, and particularly relates to an image sensor which can read image data from read regions with different shapes and apply a buffer with reduced size.

2. Description of the Prior Art

FIG. 1 is a schematic diagram illustrating a prior art optical touch control apparatus. As shown in FIG. 1, the optical touch control apparatus 100 comprises a touch control panel 101, an image sensor 102, light guiding devices 105, 109 with bar shapes and photo diodes 103, 107, 111, 113. The light guiding devices 105, 109 are provided at two sides of the touch control panel 101. The photo diodes 103, 107, 111, 113 are respectively provided at the endings of the light guiding devices 105, 109, to project light to the touch control panel 101 via the light guiding devices 105, 109. The image sensor 102 is provided opposite to the light guiding devices 105, 109. If an object Ob (ex. user's finger) moves on the touch control panel 101, the image sensor 102 can sense the projection image for the object image Ob, which means the dark region generated via shading light from the light guiding devices 105, 109 by the object Ob. The location for the object Ob is computed accordingly.

The image sensor 102 can comprise a pixel array 120 and an image data reading circuit 122, as shown in FIG. 2 and FIG. 3. The data reading circuit 120 senses the image and generates the image data. The image data reading circuit 122 reads the image data generated by the pixel array 120. Please refer to FIG. 2, which illustrates a projection image for an ideal object track on the image sensor 102 in FIG. 1. The ideal state here means no error or skew occurs when the touch control panel 101 and the image sensor 102 are fabricated. In such case, the light guiding devices 105, 109 present a rectangular bright background on the pixel array 120 as shown in FIG. 2. The movement for the object on the touch control panel generates dark region to the bright background, therefore the bright background can be regarded as a possible moving track for the object Ob. However, practically the product has assembly tolerance, such that the error or skew may occurs when the touch control panel 101 and the image sensor 102 are fabricated. In such case, the moving track Obt' for the object Ob on the pixel array 120 is an oblique parallelogram as shown in FIG. 3.

The image data reading circuit 122 always reads the data of the pixel array 120 row by row or column by column. Therefore, the example in FIG. 2 only needs to read image data of the pixel rows in the moving track Obt to acquire the location of the object Ob. However, the example in FIG. 3 needs to read image data of all pixel rows or all pixel columns to acquire the image data for all pixels in the moving track Obt' to acquire the location of the object Ob. In such case the image data reading circuit 122 needs much time to read the image data.

In some systems, a frame buffer is provided for the image sensor for buffering image data until image data for a whole frame is received. A size for a conventional frame buffer is always equal to a size of a frame, which is equal to a size of the sensing matrix. In one example, a sensing matrix has a size of 150 pixels×1024 pixels, that is, the sensing matrix comprises 150 rows×1024 columns, in such case a size of a conventional frame buffer is 150 rows×1024 columns.

However, in above-mentioned cases, only image data for the read region, which is smaller than the whole sensing matrix, is read. Accordingly, much space of the conventional frame buffer is wasted.

SUMMARY OF THE INVENTION

Therefore, one purpose of the present invention is to provide an image sensing method and an image sensor, which can apply a buffer with a reduced size.

One embodiment of the present invention discloses an image sensor, which comprises: an image sensing unit array, for sensing an object and comprising a plurality of image sensing units arranged in a sensing matrix with M rows and N columns; an image data reading circuit, for reading and outputting image data caught by at least part of the image sensing units; and a control unit, for controlling numbers and locations of the image sensing units for each row or each column, from which the image data reading circuit reads the image data; for computing a read region that is in the image sensing unit array and corresponds to the object; and for controlling the image data reading circuit to read at least part of the image data of the column or the row. The part of the column or the row, which is read, comprises the read region. The image sensor further comprises a line buffer, including N buffer regions corresponding to the N columns of the image sensing unit array, wherein the image data from the image sensing units in a k-th column of the image sensing unit array is summed in a k-th buffer region of the line buffer.

In another embodiment, the image sensor comprises: a buffer having a first buffer row and a second buffer row, each of the first buffer row and the second buffer row comprising N buffer regions corresponding to the N columns of the image sensing unit array. Image data from the image sensing units meeting a first condition in a k-th column of the image sensing unit array is summed in the k-th buffer region of the first buffer row. Image data from image sensing units meeting a second condition in the k-th column of the image sensing unit array is summed in the k-th buffer region of the second buffer row.

In still another embodiment, the image sensor comprises: a line buffer, including M buffer regions corresponding to the M rows of the image sensing unit array, wherein the image data from the image sensing units in a k-th row of the image sensing unit array is summed in a k-th buffer region of the line buffer.

In view of above-mentioned embodiments, the present invention can read the image data of the read region via only part image data for rows or columns. Therefore, it does not need to read all regions for the pixel array, or to read a region that is larger than the read region, thereby the time for reading the image data can be decreased. Additionally, the present invention provides a mechanism to select the column-wise method or the row-wise method to read the image data based on the numbers of rows and columns. By this way, the operation for reading the image data can be more efficiency. Furthermore, the size of the buffer can be reduced.

These and other objectives of the present invention will no doubt become obvious to those of ordinary skill in the art

DETAILED DESCRIPTION

Figure 4:
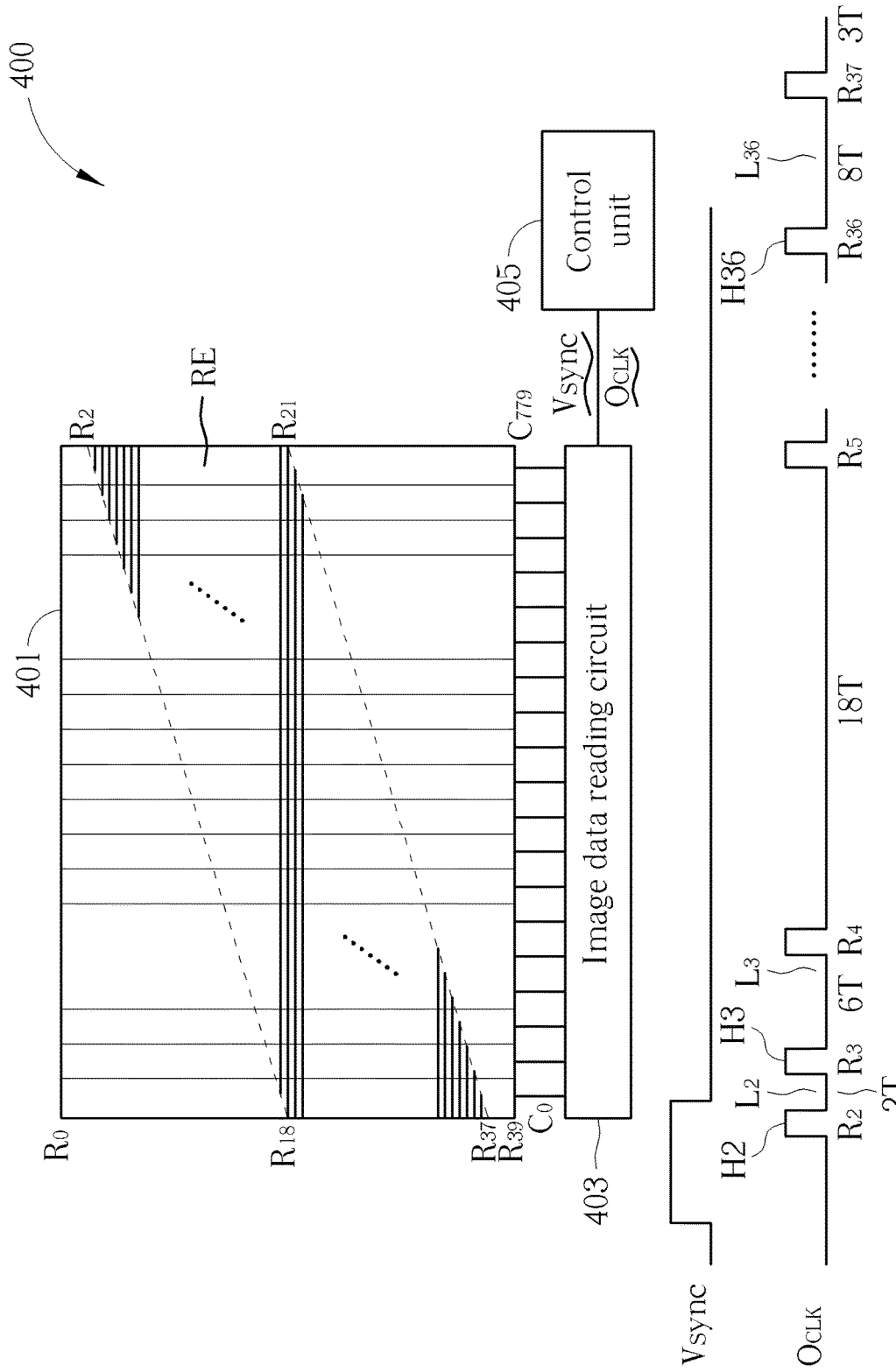
FIG. 4 to FIG. 10 are schematic diagrams illustrating image sensors according to different embodiments of the present invention.

FIG. 4 to FIG. 10 are schematic diagrams illustrating image sensors according to different embodiments of the present invention. As shown in FIG. 4, the image sensor 400 comprises a pixel array 401, an image data reading circuit 403 and a control unit 405. The image sensing unit array 401 senses an object (ex. a finger) and comprises a plurality of pixels arranged in a sensing matrix with M rows and N columns. The following embodiments are explained in the condition that M is smaller than N, but pleases note the N can be smaller than M. Also, the pixel array 401 can be replaced with other types of image sensing unit array, and the pixels can be replaced with the image sensing units in the image sensing unit array. The image data reading circuit 403 reads and outputs image data caught by at least part of the image sensing units. The control unit 405 controls numbers and locations of the image sensing units for each row or each column, from which the image data reading circuit 403 reads the image data. Also, the control unit 405 computes a read region that is in the image sensing unit array and corresponds to the object (i.e. the region that the projection image of the object locates). Additionally, the control unit 405 controls the image data reading circuit 403 to read at least part of the image data of the column or the row. The part of the column or the row, which is read, comprises the read region.

Take FIG. 4 for example, the control unit 405 computes the read region RE via computing at least one read slope. For example, the pixel array 401 comprises 40 rows and 780 columns and detects that the read region starts at a nineteenth pixel row $R_{18}$ at the left side, and starts at a third pixel row $R_2$ at the right side, thus a read slope can be acquired via the equation $$\frac{3-19}{780} = -0.0205.$$

Also, if it is known that the read region RE contains 20 rows, such that it can be acquired that the read region ends at a 38th pixel row $R_{37}$ at the left side, and ends at a 22nd pixel row $R_{21}$ at the right side. By this way the read region can be obtained. The read region corresponding to the object may have an irregular shape, such that a plurality of rectangles and parallelograms can be utilized to contain the read region. Please note the rectangles and parallelograms are only for example and do not mean to limit the scope of the present invention. Many methods can be utilized to know how many rows that the read region contains. For example, the image data reading circuit 403 reads the image data according to the read clock signal $O_{CLK}$ in FIG. 4, thus a number of the rows that the read region RE contains can be computed according to the timing of the read clock signal $O_{CLK}$. Alternatively, the number of the rows that the read region RE contains can be acquired depending on the spec of the pixel array 401 or the image data reading circuit 403. Besides computing the read slope as above-mentioned description, a background image can be caught to obtain the bright region generated by a light source. After that, one or more read regions are allocated depending on the bright region such that the read region can be formed. Please note the method for computing the read region is not limited to the above-mentioned methods. For example, a bit map can be utilized to compute the read region RE.

After getting the read region RE, the control unit 405 can accordingly read image data in the read region RE. For example, if it is computed that only two rightmost pixels of the 3rd pixel row $R_2$ are contained in the read region RE, the control unit 405 can control the image data reading circuit 403 to read only the two rightmost pixels of the 3rd pixel row $R_2$ rather than all pixels of the 3rd pixel row $R_2$. Similarly, if it is computed that the 1st-10th pixels from left to right of the 22nd pixel row $R_{21}$ are not contained in the read region RE, the control unit 405 can control the image data reading circuit 403 not to read the 1st-10th pixels from left to right of the 22nd pixel row $R_{21}$. As above-mentioned, the image data reading circuit 403 reads the image data according to the read clock signal $O_{CLK}$ in FIG. 4. In one embodiment, the high level of the read clock signal $O_{CLK}$ triggers the read operation and the image data reading circuit 403 reads the image data when the read clock signal $O_{CLK}$ has a low level. For example, after the read operation for the 3rd pixel row $R_2$ is triggered by the high level of the read clock signal $O_{CLK}$ (the time interval $H_2$), the image data reading circuit 403 reads the image data of the 3rd pixel row $R_2$ when the read clock signal $O_{CLK}$ has low level (the time interval $L_2$). In FIG. 4 the symbol 2T marked at the low level at which the image data of the 3rd pixel row $R_2$ is read indicates image data of two pixels are read. Similarly, after the read operation for the 37th pixel row $R_{36}$ is triggered by the high level of the read clock signal $O_{CLK}$ (the time interval $H_{36}$)/the image data reading circuit 403 reads the image data of the 37th pixel row $R_{36}$ when the read clock signal $O_{CLK}$ has low level (the time interval $L_{36}$). In FIG. 4 the symbol 8T marked at the low level at which the image data of the 37th pixel row $R_{36}$ is read indicates image data of eight pixels are read. However, the above-mentioned operation can be reversed (i.e. triggered by a low level and read image data at a high level). Besides, the read clock signal $O_{CLK}$, the image data reading circuit 403 can further refer to a vertical sync signal $V_{sync}$. For example, the read operation is performed when the vertical sync signal $V_{sync}$ has a low level.

Many mechanisms can be applied to the read operation such that the image data reading circuit 403 can only read the image data from desired pixels rather than all the pixels. For example, the patent application with a publication number US 2010/0295980 has disclosed a mechanism that the image data reading circuit 403 utilizes at least one multiplexer to read the image data from desired pixels. Such mechanism can be applied to the present invention, but not limited.

Figure 5:
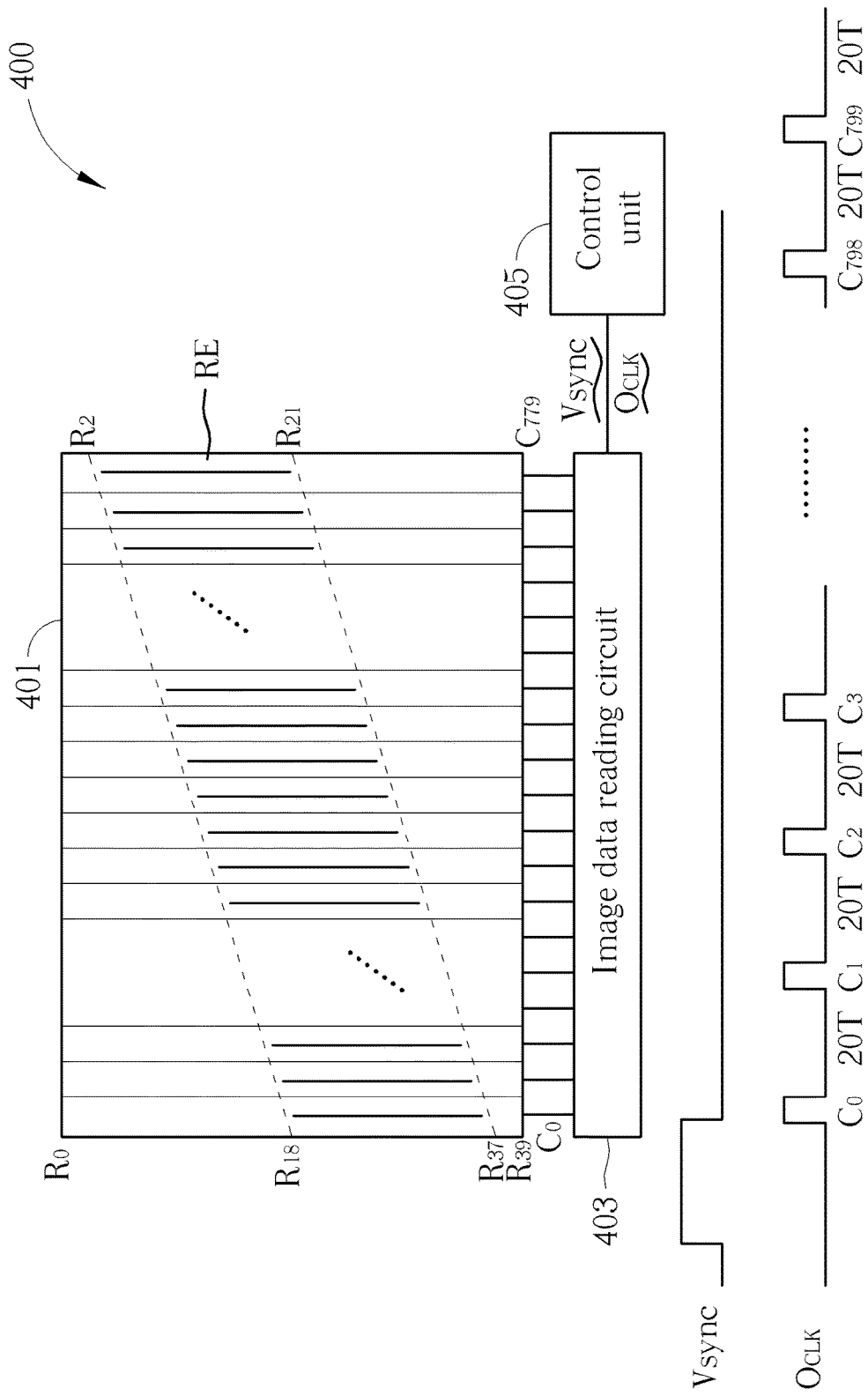

In the embodiment of FIG. 4, the image data in the read region RE is read by row-wise. The read region RE in FIG. 5 has the same size as which in FIG. 4, but the image data in the read region RE is read by column-wise. As shown in FIG. 5, the image data reading circuit 403 is triggered by the high level of the output clock signal $O_{CLK}$ when the vertical sync signal $V_{sync}$ has a low level, and reads the image data of pixel columns $C_0$-$C_{799}$ when the output clock signal $O_{CLK}$ has a low level. The numbers for the pixel which are read in each pixel column in the read region RE in FIG. 5 are all 20, since the read region RE is a parallelogram. The image data of the read region RE can be read by row-wise or column wise depending on different requirements. As above-mentioned, the pixel array 401 is a sensing matrix with M rows and N columns. Therefore, in one embodiment, the control unit 405 controls the image data reading circuit 403 to read the image data in the read region RE by row-wise if the M is smaller than N. The control unit 405 controls the image data reading circuit 403 to read the image data in the read region RE by column-wise if the M is larger than N. Either the row-wise method or the column-wise method needs a synchronizing signal to trigger, for example, the $H_{sync}$, but it may changes to $V_{sync}$ depending on the situations. Therefore, more row or columns are read, more synchronizing signals are needed, such that more time is needed to perform the read operation. Accordingly, the column-wise method needs less synchronizing signals if M is larger than N (i.e. the number of rows is larger than the number of columns). For example, if M=1000 and N=100, the row-wise method needs 1000 synchronizing signals, but only 100 synchronizing signals are needed for the column-wise method. Thereby the image data reading circuit 403 can use less times of read operations to read the image data in the read region RE such that the read time can be saved. By this way, less time is needed to read each frame, thus the frame rate for image processing can be increased.

Figure 6:
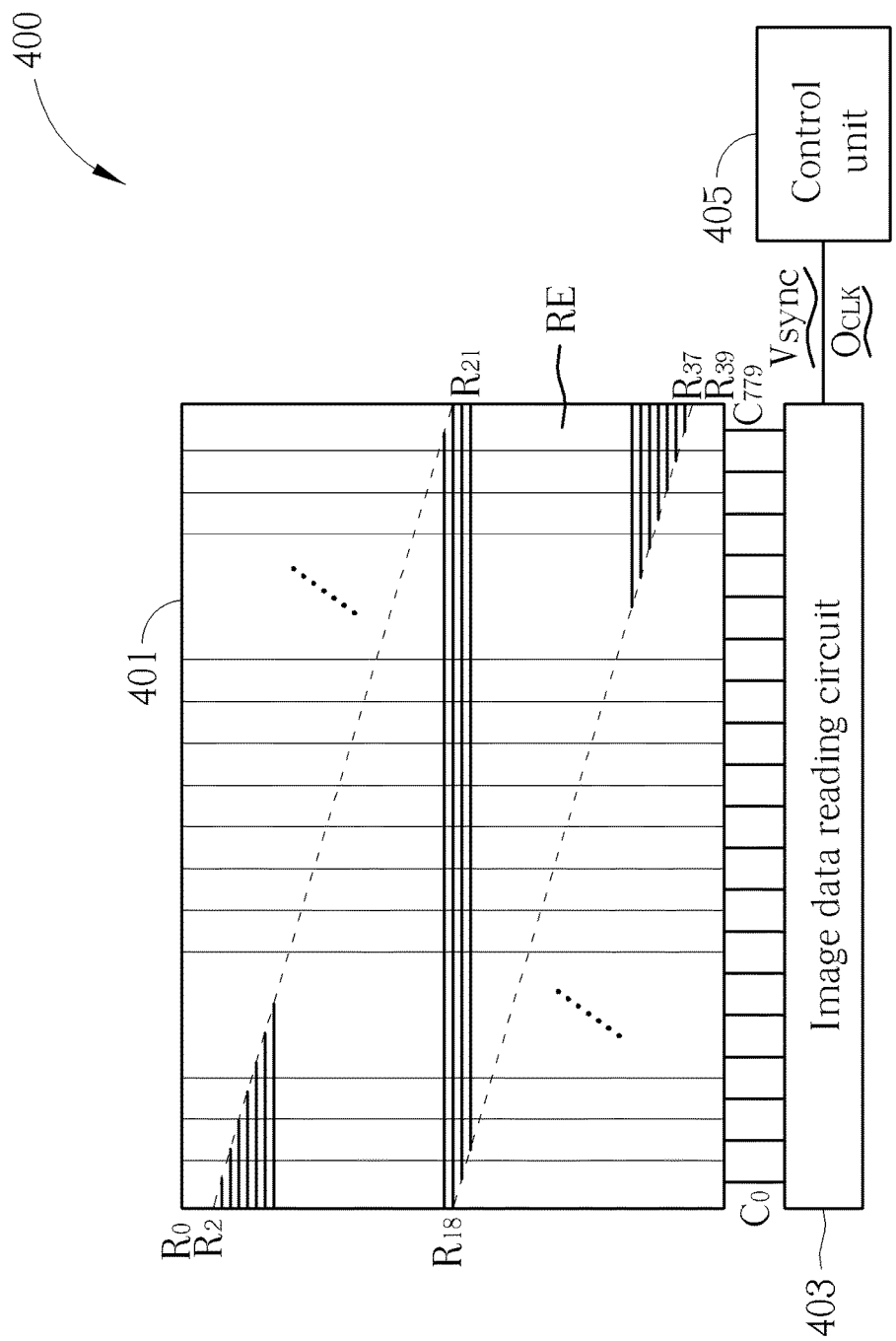
Figure 7:
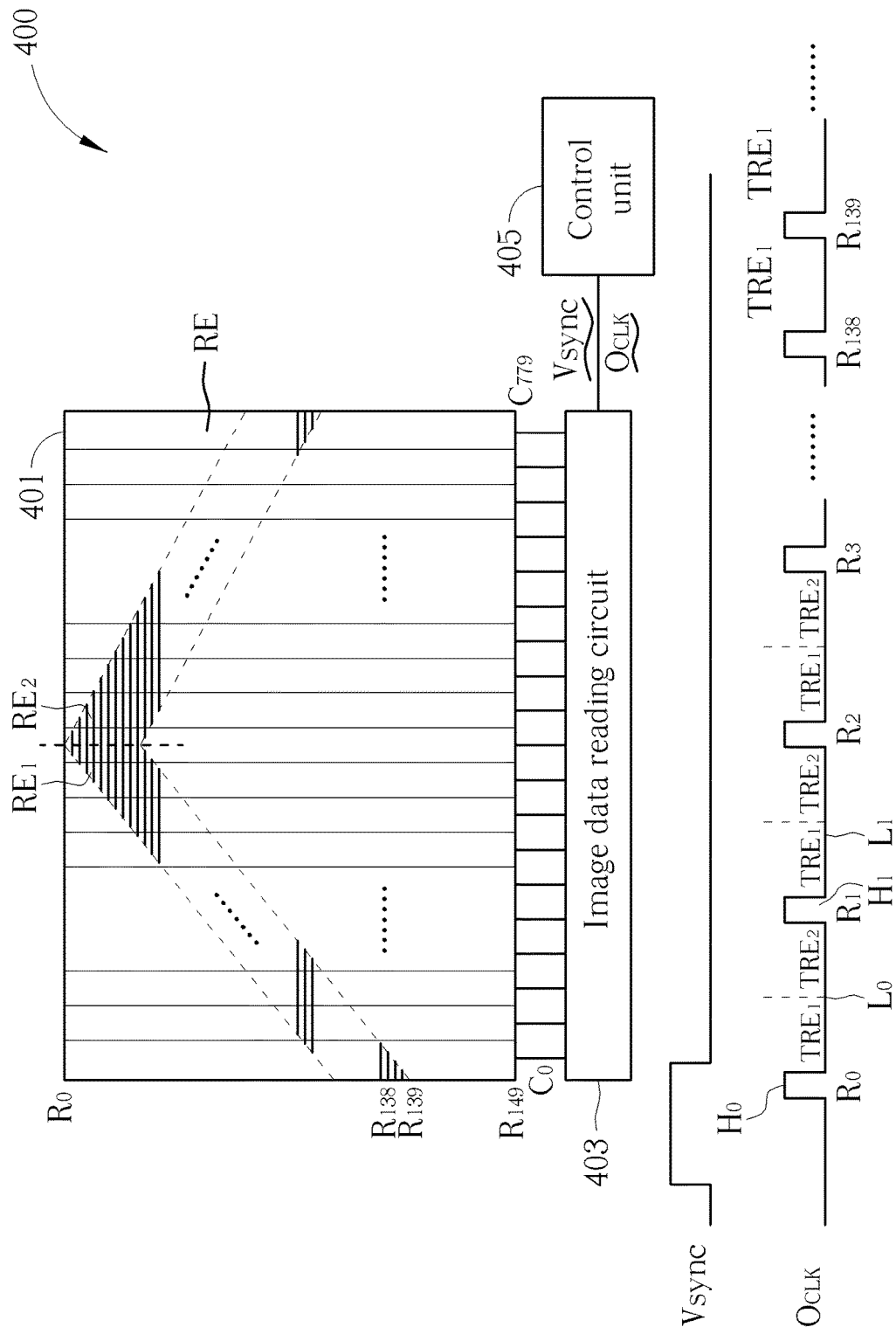

Besides the parallelograms in FIG. 4 and FIG. 5, the read region can be other shapes. For example, a parallelogram with other slopes, a V shape, an inverted V shape, a polygon with K sides, wherein the K is a positive integer larger than 3. That is, besides the parallelogram, the V shape, and the inverted V shape, the read region can be other regular or non-regular polygons (ex. quadrangle, pentagon, hexagon), which will be described in the following description. In the embodiment of FIG. 6, the read region RE is also a parallelogram, but the slops for the upper edge and the bottom edge are opposite to which of the parallelogram in FIG. 4 and FIG. 5. In the embodiment of FIG. 6, the mechanism that the control unit 405 utilizes to compute the read region RE and the mechanism that the image data reading circuit 403 utilizes to read image data of desired pixels are the same as which for above-mentioned embodiments, thus are omitted for brevity here. In the embodiment of FIG. 7, the read region is an inverted V shape with a first read region $RE_1$ and a second read region $RE_2$. Similar with the above-mentioned embodiment, the control unit 405 controls the image data reading circuit 403 to read the image data in the read regions $RE_1$, $RE_2$ when the read clock signal $O_{CLK}$ has a low level. The control unit 405 separates each low level region of the read clock signal $O_{CLK}$ to a first read region time interval $TRE_1$ and a second read region time interval $TRE_2$. The image data reading circuit 403 reads image data for the pixels of the first read region $RE_1$ in the first read region time interval $TRE_1$, and reads image data for the pixels of the second read region $RE_2$ in the second read region time interval $TRE_2$. If the control unit 405 computes the read region via computing the read slope as above-mentioned description, more than one read slops must be computed. For example, at least one first read slope can be computed to define the first read region time interval $TRE_1$, and at least one second read slope can be computed to define the second read region time interval $TRE_2$.

In the embodiment of FIG. 7, the image data reading circuit 403 reads image data for a single pixel row in a single period of the read clock signal $O_{CLK}$. The single period here comprise the high level time interval for triggering and the low level time interval for reading data. For example, the read clock signal $O_{CLK}$ has a high level in the time interval $H_0$, to trigger the reading operation for the pixel row $R_0$. Besides, the read clock signal $O_{CLK}$ has a low level in the time interval $L_0$, in which the image data of the pixel row $R_0$ is read. The single period of the read clock signal $O_{CLK}$ comprises the time interval $H_0$ and the time interval $L_0$. Similarly, the time interval $H_1$ for triggering the reading operation for the pixel row $R_1$ and the time interval $L_1$ in which the image of the pixel row $R_1$ is read form a single period of the read clock signal $O_{CLK}$ as well. The image data reading circuit 403 reads image data for a single pixel row in a single period of the read clock signal $O_{CLK}$. For example, in the single period comprising the time intervals $H_0$ and $L_o$, the image data reading circuit 403 reads the image data for the pixel $R_0$ in the first read region $RE_1$ in the first read region time interval $TRE_1$, and reads the image data for the pixel $R_0$ in the second read region $RE_2$ in the second read region time interval $TRE_2$. Similarly, in the single period comprising the time intervals $H_1$ and $L_1$, the image data reading circuit 403 reads the image data for the pixel $R_1$ in the first read region $RE_1$ in the first read region time interval $TRE_1$, and reads the image data for the pixel $R_1$ in the second read region $RE_2$ in the second read region time interval $TRE_2$. Since the first read region $RE_1$ comprises the pixel rows $R_{138}$ and $R_{139}$ but the second read region $RE_2$ does not comprise the pixel rows $R_{138}$ and $R_{139}$, the single period for the read clock signal $O_{CLK}$ corresponding only comprises the first read region time interval $TRE_1$. The embodiment in FIG. 7 can read the image in column-wise, as above-mentioned. Also, the embodiment in FIG. 7 can select the column-wise method or the row-wise method depending on the numbers for rows and columns.

Figure 1:
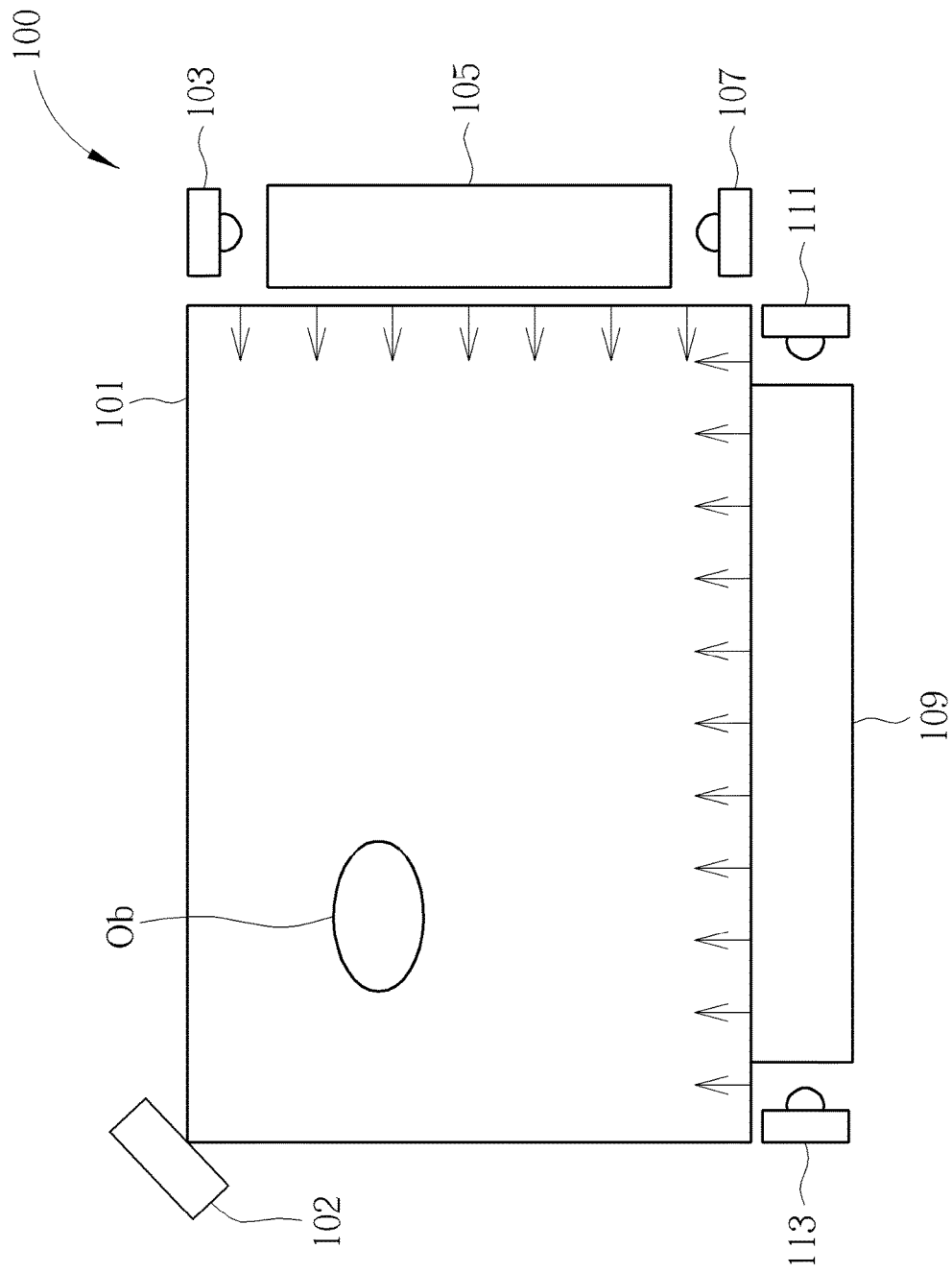
FIG. 1 is a schematic diagram illustrating a prior art optical touch control apparatus.
Figure 2:
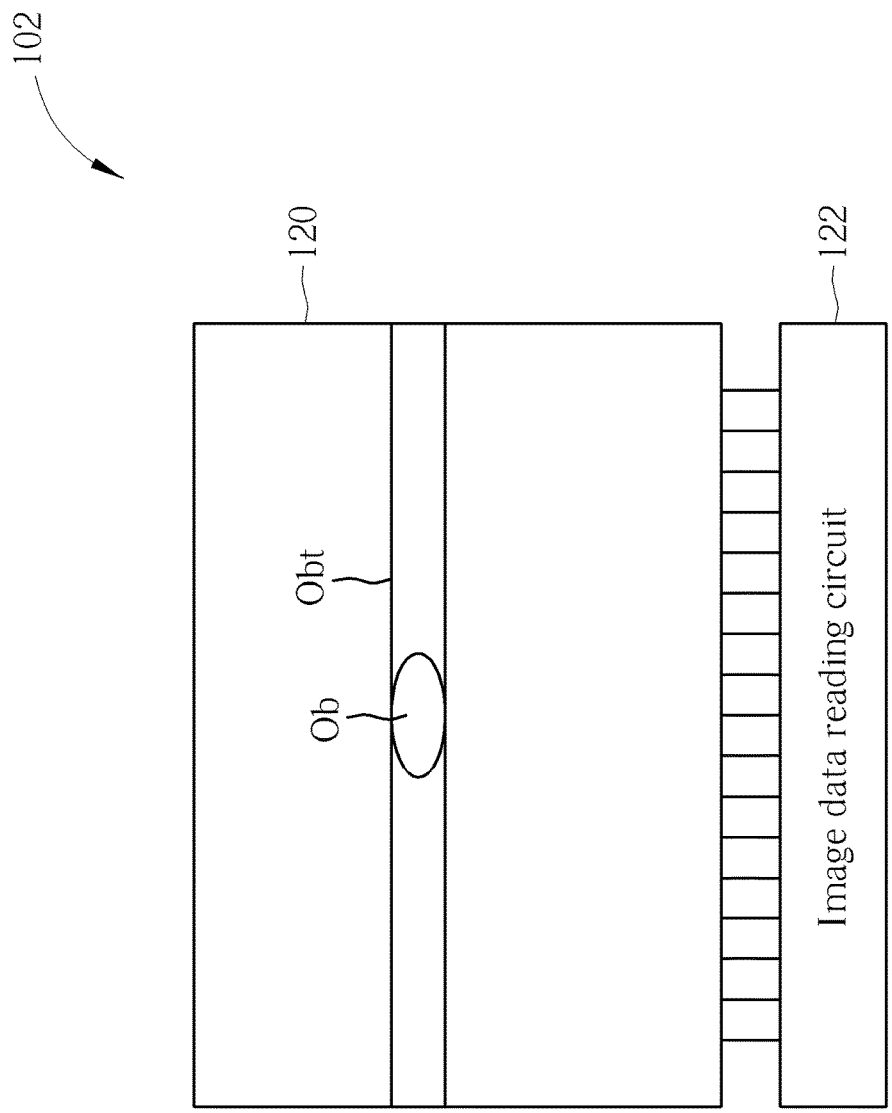
FIG. 2 is a schematic diagram illustrating a projection image for an ideal object track on the image sensor in FIG. 1.
Figure 3:
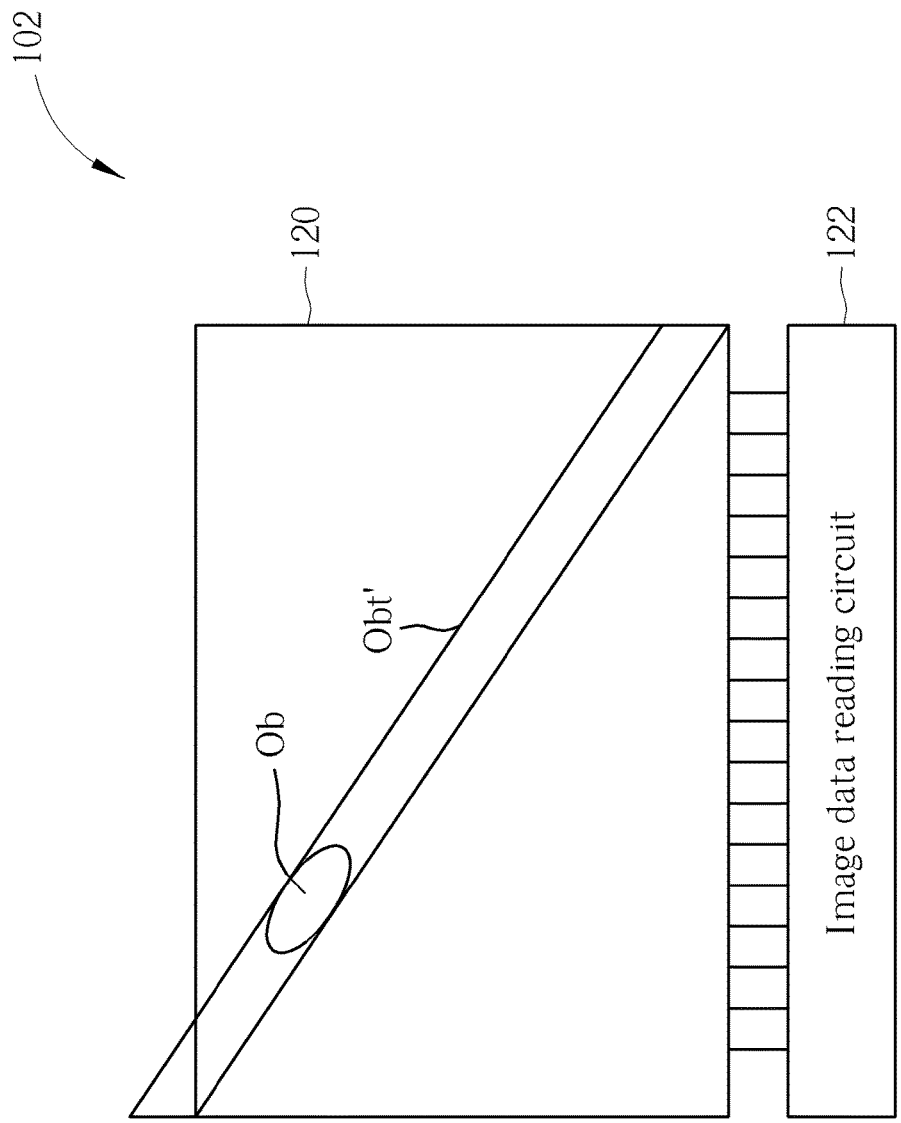
FIG. 3 is a schematic diagram illustrating a projection image for an object track having error on the image sensor in FIG. 1.
Figure 8:
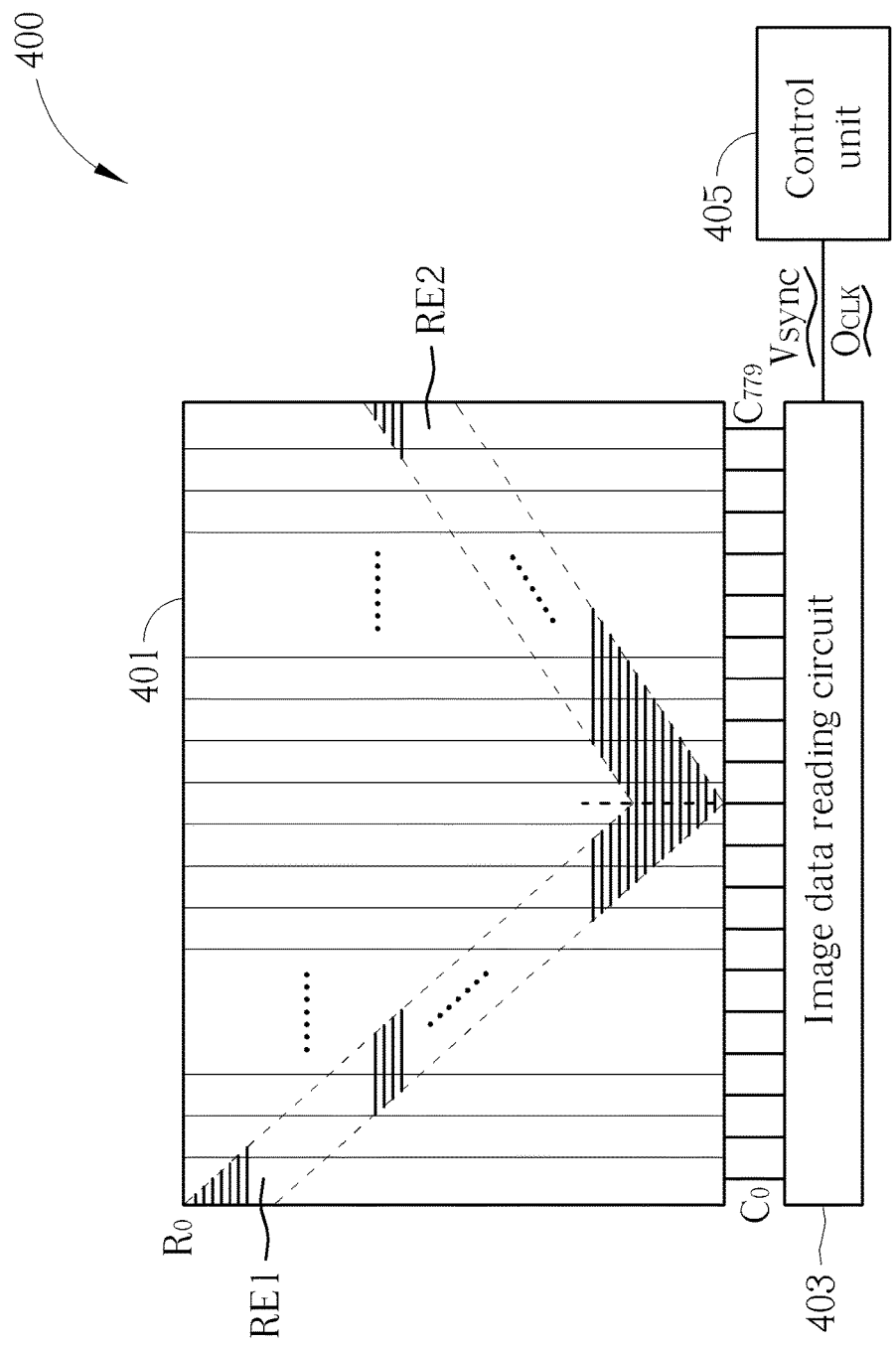
Figure 9:
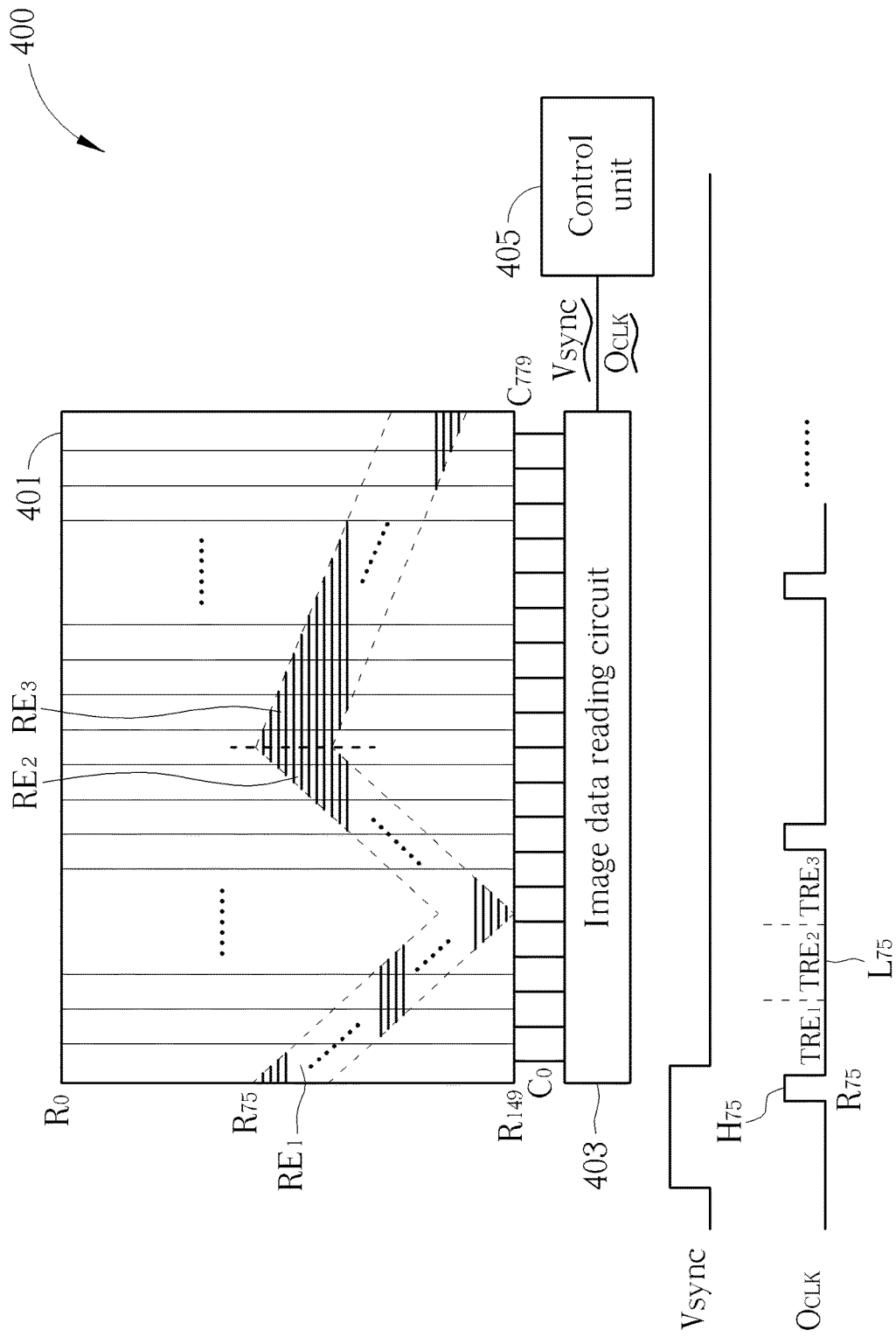
Figure 10:
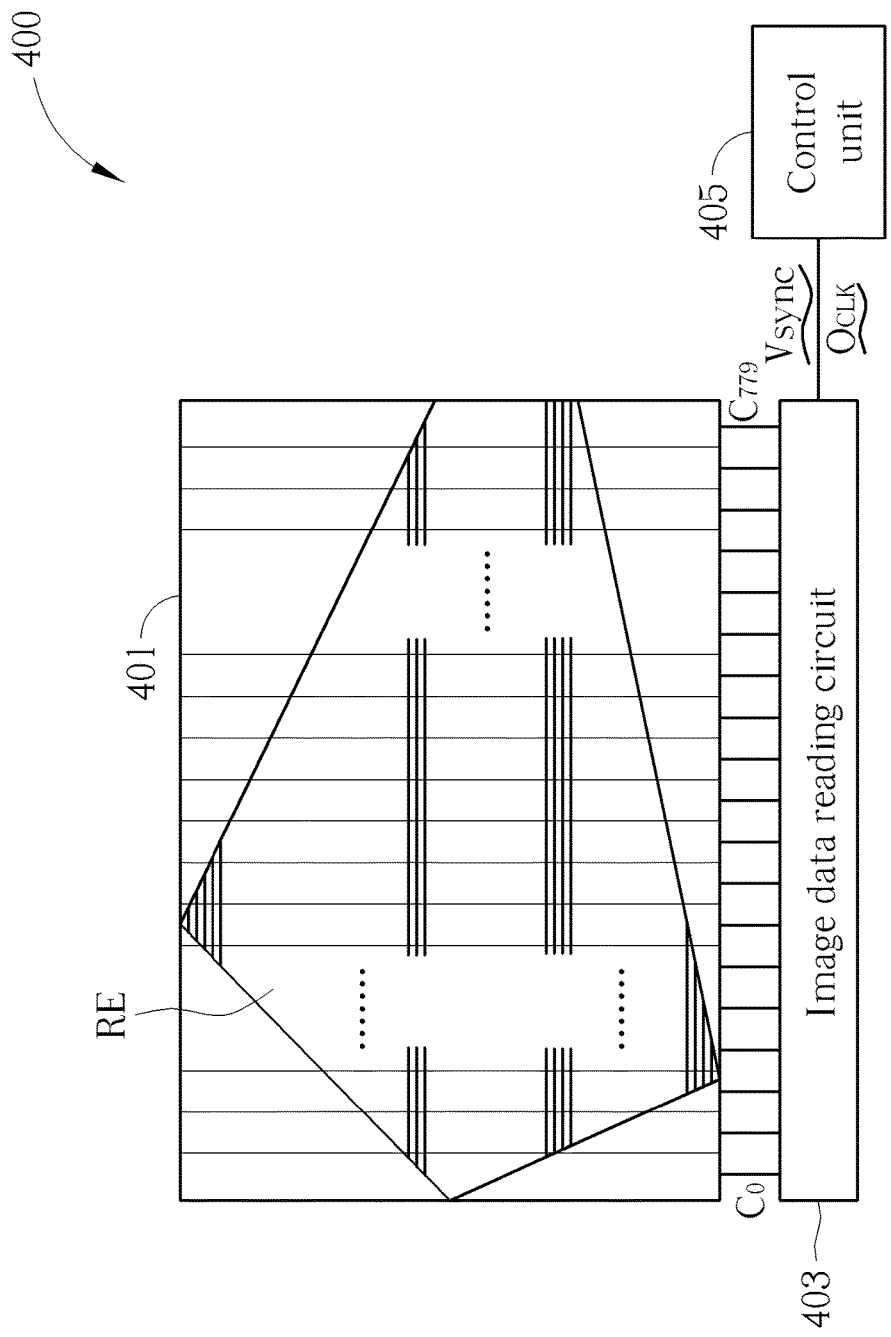

In the embodiment of FIG. 8, the read region also comprises a first read region $RE_1$ and a second read region $RE_2$, which form a read region with an inverted V shape. In FIG. 8, the operation for the control unit 405 to compute the read region and the operation for the image data reading circuit 403 to read the image data is the same as which of FIG. 7, thus it is omitted for brevity here. In the embodiment of FIG. 9, the read region comprises a first read region $RE_1$, a second read region $RE_2$ and a third read region $RE_3$. In such case, the operation for the control unit 405 to compute the read region is the same as which for the embodiment in FIG. 7, but the control unit 405 needs to particularly allocate time for reading the third read region $RE_3$ for a single period of the read clock signal $O_{CLK}$. For example, the low level time interval $L_{75}$ for reading the pixel row $R_{75}$. In the embodiment of FIG. 10, the read region RE is a pentagon, and the control unit 405/image data reading circuit 403 can utilize the operation described in the embodiments of FIG. 4, FIG. 5 to compute the read region and to read the image data. Please note the above-mentioned embodiments are only for example to explain the present invention, but do not meant that the scope of the present invention is limited to the read regions with the above-mentioned shapes. The above-mentioned mechanism according to the present invention can be applied to read regions with any other shape. Additionally, the above-mentioned image sensor is not limited to the optical touch control apparatus in FIG. 1, but also can be applied to any other electronic apparatus.

Figure 11:
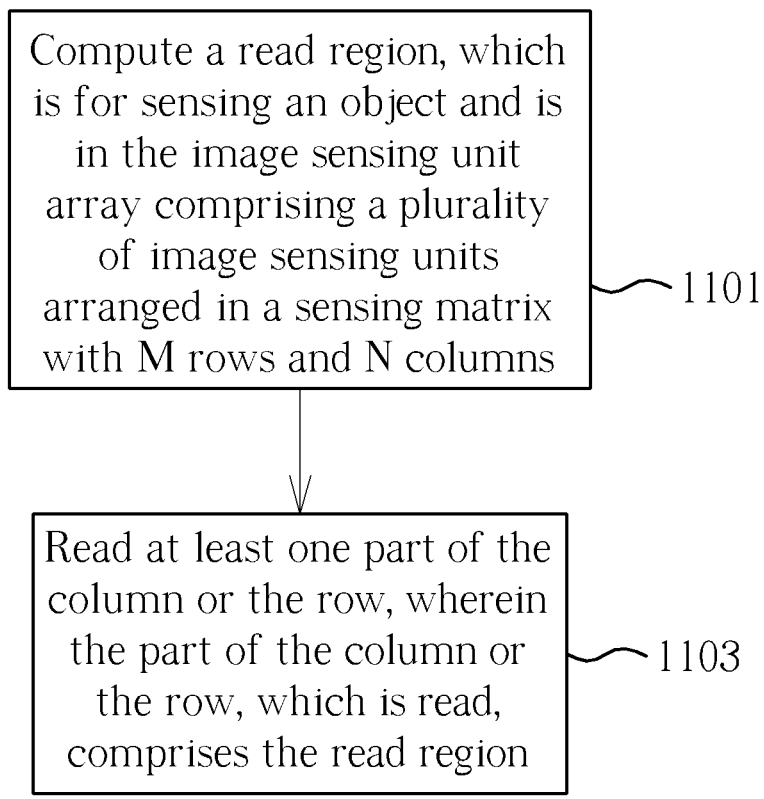
FIG. 11 is a flow chart illustrating an image sensing method according to an embodiment of the present invention.

In view of above-mentioned embodiments, the image sensing method in FIG. 11 can be acquired, which comprises the following steps:

Step 1101

Compute a read region, which is for sensing an object and is in the image sensing unit array comprising a plurality of image sensing units arranged in a sensing matrix with M rows and N columns.

Step 1103

Read at least one part of the column or the row, wherein the part of the column or the row, which is read, comprises the read region.

Other detail characteristics can be acquired in view of above-mentioned embodiments, thus are omitted for brevity here.

Following embodiments provide an image sensor which not only can read image data from read regions with different shapes but also applies a buffer with a reduced size.

FIG. 12 to FIG. 15 are schematic diagrams illustrating image sensors according to different embodiments of the present invention, which apply a buffer having a reduced size. Please note, in these embodiments, the above-mentioned image data reading circuit 403 and the control unit 405 are not illustrated here for the convenience of explaining.

Figure 12:
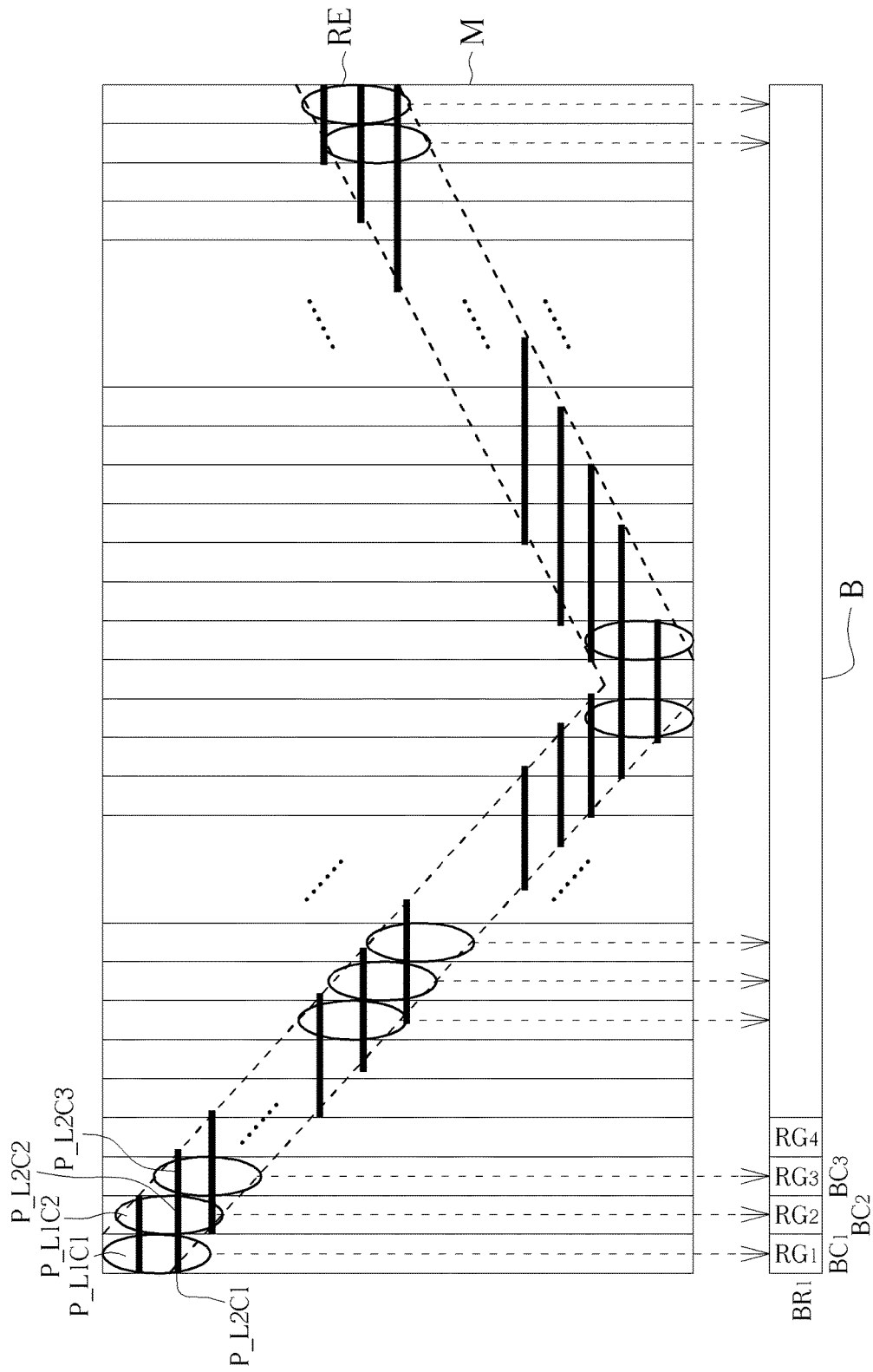
FIG. 12 to FIG. 15 are schematic diagrams illustrating image sensors according to different embodiments of the present invention, which apply a buffer having a reduced size.

Please refer to FIG. 12. In such embodiment, a size of the sensing matrix is 150 pixels×1024 pixels. That is, the sensing matrix comprises 150 rows and 1024 columns, but not limited. The image data of the read region RE is read by the image data reading circuit 403 and stored to the buffer B (or named a line buffer B). The buffer B comprises one buffer row $BR_1$ and 1024 buffer columns (only three symbols $BC_1$, $BC_2$ and $BC_3$ are marked). The buffer row $BR_1$ comprises 1024 pixels and each of the buffer columns comprises 1 pixel.

In the embodiment of FIG. 12, the image data for the reading region RE is read by row-wise, and then the image data is sequentially stored to the buffer. In one embodiment, if the image data is to be stored to a buffer region of the buffer B which does not store any image data, the image data is directly stored to the buffer region of the buffer. On the opposite, if the image data is to be stored to a buffer region of the buffer which already stores previous image data, the control unit reads the previous data and sums the previous data and the image data to generate update image data, and then the control unit controls the update image data to be stored to the buffer region of the buffer.

For example, if the image data for the first row of the sensing region RE is read, the image data for the pixels P_L1C1 and P_L1C2, is read and directly, respectively stored to the buffer regions $RG_1$ and $RG_2$ since the buffer regions $RG_1$ and $RG_2$ store no previous image data. After that, if the image data for the second row of the sensing region RE is read, the image data for the pixels P_L2C1, P_L2C2, and P_L2C3 are read. In such case, the image data for the pixels P_L2C3 is read and directly stored to the buffer region $RG_3$ since the buffer region $RG_3$ stores no previous image data. However, the image data for the pixels P_L2C1 and P_L2C2 are respectively summed with the previous image data stored in the buffer regions $RG_1$, $RG_2$ (i.e. the image data for the pixels P_L1C1 and P_L1C2) to generate update image data. After that, the update image data is stored to the buffer regions $RG_1$, $RG_2$.

Figure 13:
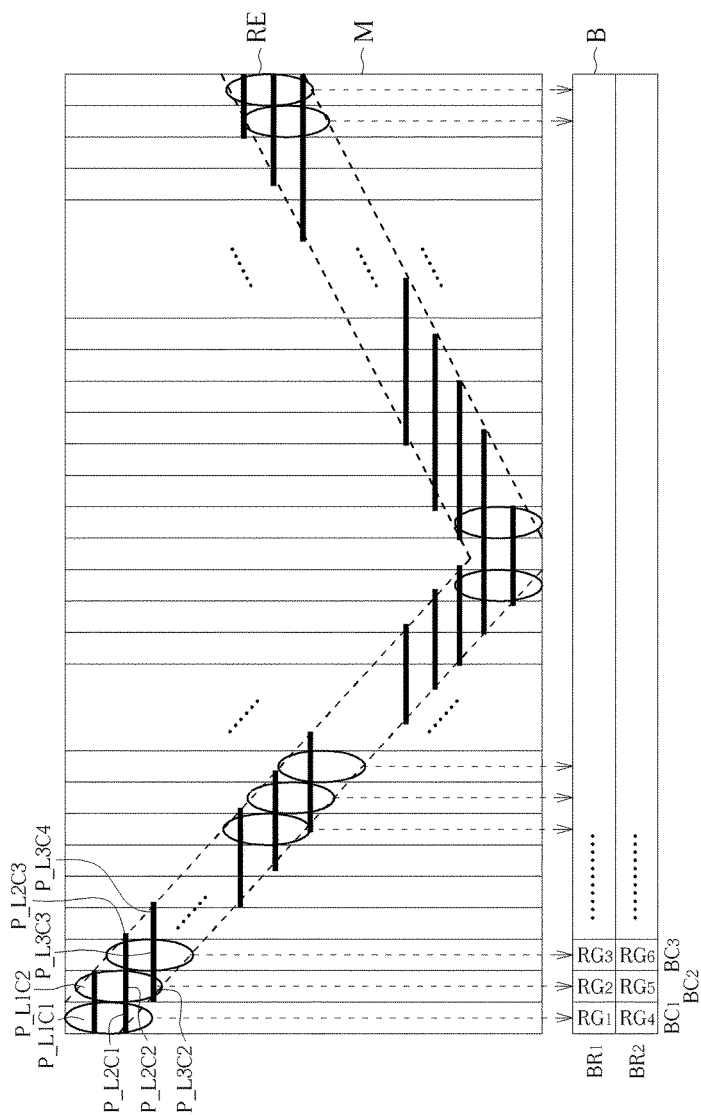

The buffer can comprise more than one buffer rows rather than only one buffer row. As illustrated in FIG. 13, the buffer B further comprises the buffer row $BR_2$ besides the buffer row $BR_1$, and comprises 1024 columns. Each of the buffer rows $BR_1$ and $BR_2$ comprises 1024 pixels and each of the buffer columns comprises 1 pixel.

In such case, the image data for the read region RE is also sequentially stored to the buffer B by row-wise. For example, if the first row of the read region RE is read, the image data for the pixels P_L1C1 and P_L1C2 are read and stored to the buffer regions $RG_1$ and $RG_2$. If the second row of the read region RE is read, the image data for the pixels P_L2C1, P_L2C2, and P_L2C3 are read and directly stored to the buffer regions $RG_4$, $RG_5$ and $RG_6$. Thereof, image data from odd rows of the read region will be stored into the first buffer row $BR_1$ and the image data from even rows of the read region will be stored into the first buffer row $BR_2$.

Also, if the third row of the read region RE is read, the image data for the pixel P_L3C2 is read and summed with the image data for pixel P_L1C2 to generate update image data. After that, the update data are stored to the buffer region $RG_2$. The image data for the pixel P_L3C3 is directly and respectively stored to the buffer regions $RG_3$ since no previous image data is stored in the buffer region $RG_3$.

Please note the image data reading operation is not limited to above-mentioned embodiments. In one embodiment, image data for more than one buffer row is read per time. For example, the first buffer row and the second buffer row are simultaneously read, that is, the image data for the pixels P_L1C1, P_L1C2, PL2C1, PL2C2 and PL2C3 are read and respectively stored to the buffer regions $RG_1$, $RG_2$, $RG_3$, $RG_4$, $RG_5$ and $RG_6$. In the next reading operation, the image data for the third row and the fourth row is simultaneously read and respectively stored to the buffer B. The following operation can be understood in view of above-mentioned description. Such variation should also fall in the scope of the present invention.

In one embodiment, the two buffer rows $BR_1$ and $BR_2$ can be designed for storing image data from pixels corresponding to different conditions. For example, the buffer row $BR_1$ is designed for storing image data from each pixel in the corresponding column, and the buffer row $BR_2$ is designed for storing image data from pixels which has brightness value over a first threshold in the corresponding column.

Figure 14:
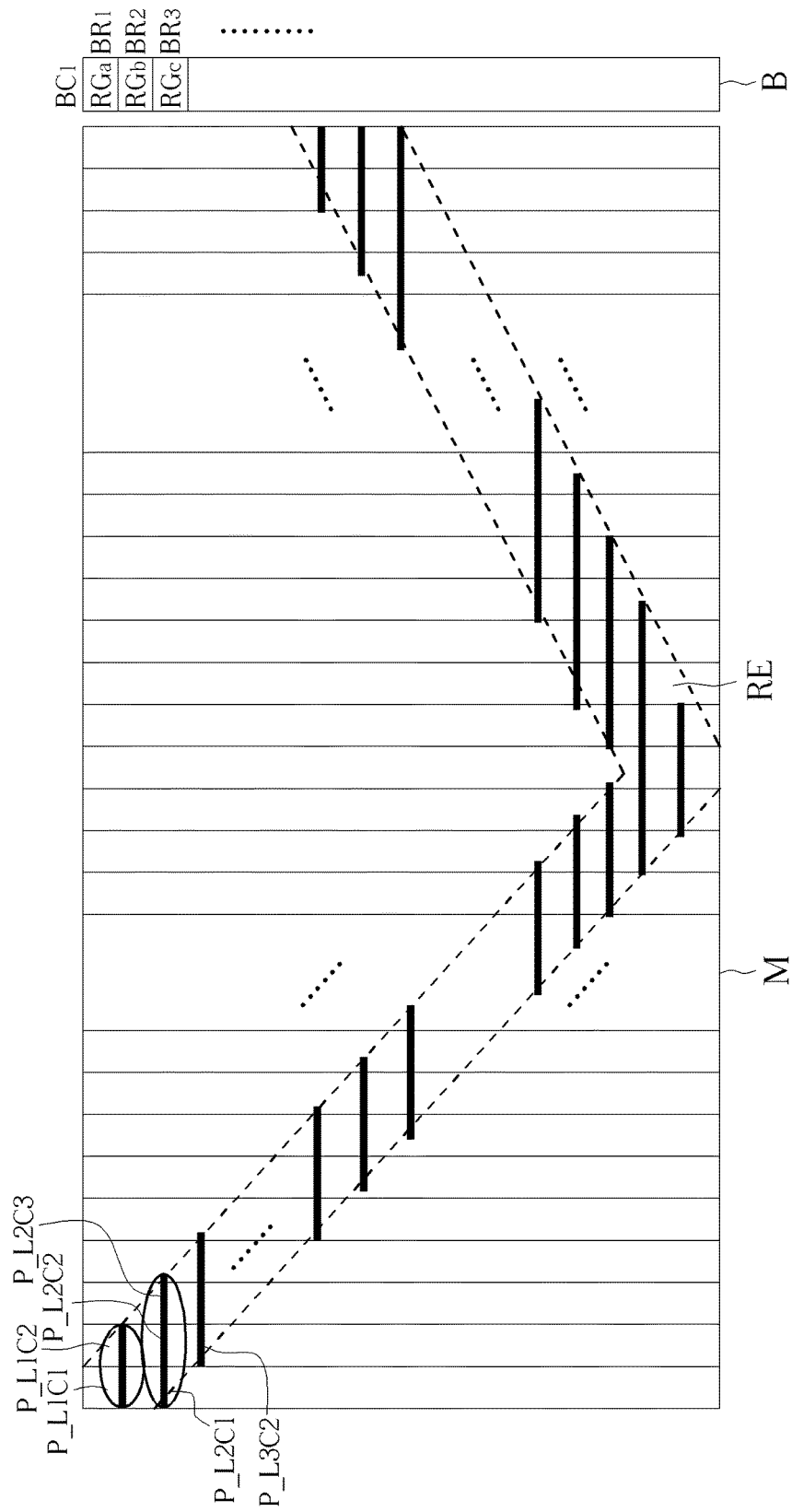

In above-mentioned embodiments, a number for the buffer rows of the buffer is smaller than a number for the buffer columns of the buffer. However, a number for the buffer rows of the buffer is larger than a number for the buffer columns of the buffer in another embodiment. As illustrated in FIG. 14, a size of the sensing matrix M is 150 pixels×1024 pixels and the buffer B comprises 150 rows and one column. Each of the buffer rows comprises 1 pixels and the buffer column comprises 150 pixels.

In the embodiment of FIG. 14, the image data for the read region RE is read by column-wise. Specifically, if the first column of the reading region RE is read, the image data for pixels P_L1C1 and P_L2C1 is read and directly, respectively stored to the buffer regions RGa and RGb. If the second column of the reading region RE is read, the image data for pixels P_L1C2, P_L2C2 and P_L3C2 is read. The image data for the pixel P_L3C2 is directly stored to the buffer region RGc since the buffer region RGc does not store previous image data. The image data for the pixels P_L1C2 and P_L2C2 are respectively summed with the image data for the pixels P_L1C1 and P_L2C1 stored in the buffer regions RGa and RGb to generate update image data. Then, the update image data is respectively stored to the buffer regions RGa and RGb. Detail operations for the embodiment illustrated in FIG. 14 can be understood based on the description of the embodiment illustrated in FIG. 12, thus are omitted for brevity here.

Figure 15:
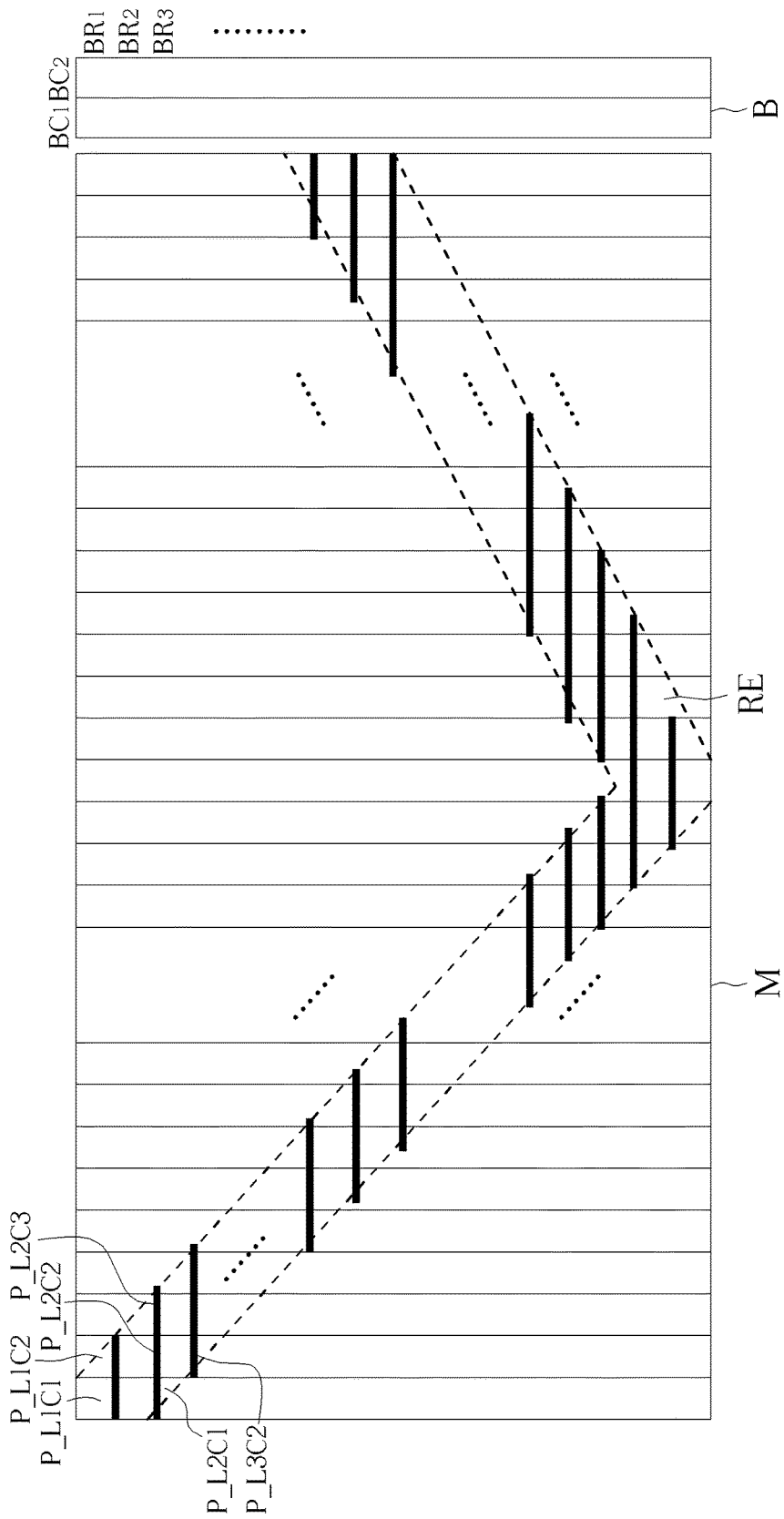

The embodiment illustrated in FIG. 14 is not limited to comprise only one buffer column. As illustrated in FIG. 15, the buffer B further comprises a buffer column $BC_2$ besides the buffer column $BC_1$. Detail operations for the embodiment illustrated in FIG. 15 can be understood based on the description of the embodiment illustrated in FIG. 13, thus are omitted for brevity here.

In view of the embodiment illustrated in FIG. 12-FIG. 15, a number for the buffer rows of the buffer can be smaller or larger than a number for the buffer columns of the buffer. Therefore, an image sensor provided by the present invention can be summarized as below: An image sensor, comprising: an image sensing unit array, for sensing an object and comprising a plurality of image sensing units arranged in a sensing matrix with M rows and N columns; an image data reading circuit, for reading and outputting image data caught by at least part of the image sensing units; a control unit, for controlling numbers and locations of the image sensing units for each row or each column, from which the image data reading circuit reads the image data; for computing relations between a read region and each the row or each the column, wherein the read region in the image sensing unit array and corresponds to the object; and for controlling the image data reading circuit to read at least part of the image data of the column or the row according to the relations. The operations for the image sensing unit array, the image data reading circuit and the control unit are clearly defined in the embodiments of FIG. 1-FIG. 11.

Besides, corresponding to the embodiment of FIG. 12, the image sensor further comprises: a line buffer, including N buffer regions corresponding to the N columns of the image sensing unit array. The image data from the image sensing units in a k-th column of the image sensing unit array is summed in a k-th buffer region of the line buffer. For example, in FIG. 12 the image data for the pixels P_L1C1 and P_L2C1 is summed in the buffer region $RG_1$.

Corresponding to the embodiment illustrated in FIG. 13, the image sensor further comprises: a buffer having a first buffer row and a second buffer row, each of the first buffer row and the second buffer row comprising N buffer regions corresponding to the N columns of the image sensing unit array. Image data from the image sensing units meeting a first condition in a k-th column of the image sensing unit array is summed in the k-th buffer region of the first buffer row. Image data from image sensing units meeting a second condition in the k-th column of the image sensing unit array is summed in the k-th buffer region of the second buffer row.

As above-mentioned, in one embodiment, the first condition is that the image sensing units are image sensing units of the k-th column of the image sensing unit array. Also, in another embodiment, the second condition is that the image data are from image sensing units having brightness values over a first threshold in the k-th column. Besides, in still another embodiment, the first condition is that the image sensing units are image sensing units of odd columns of the image sensing unit array, and the second condition is that the image sensing units are image sensing units of even columns of the image sensing unit array.

Besides, in view of the embodiment of FIG. 14, the image sensor further comprises: a line buffer, including M buffer regions corresponding to the M rows of the image sensing unit array. The image data from the image sensing units in a k-th row of the image sensing unit array is summed in a k-th buffer region of the line buffer. For example, in FIG. 14 the image data for the pixels P_L1C1 and P_L1C2 is summed in the buffer region $RG_1$.

The summarizing for the embodiment of FIG. 15 can be acquired in view of the embodiments of FIG. 13 and FIG. 14, thus are omitted for brevity here.

In view of above-mentioned embodiments, the present invention can read the image data of the read region via only part image data for rows or columns. Therefore, it does not need to read the entire pixel array, or to read a region that is larger than the read region, thereby the time for reading the image data can be decreased. Additionally, the present invention provides a mechanism to select the column-wise method or the row-wise method to read the image data based on the numbers of rows and columns. By this way, the operation for reading the image data can be more efficiency. Furthermore, the size of the buffer can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image sensor, comprising:
   an image sensing unit array, for sensing an object and comprising a plurality of image sensing units arranged in a sensing matrix with M rows and N columns;
   an image data reading circuit, for reading and outputting image data caught by at least part of the image sensing units;
   a control unit,
      for controlling numbers and locations of the image sensing units for each row or each column, from which the image data reading circuit reads the image data;
      for computing relations between a read region and each of the rows or each of the columns, wherein the read region in the image sensing unit array and corresponds to the object; and
      for controlling the image data reading circuit to read at least part of the image data of the column or the row according to the relations; and
   a buffer comprising a plurality of buffer rows having a first buffer row and a second buffer row, each of the first buffer row and the second buffer row comprising N buffer regions corresponding to the N columns of the image sensing unit array,
   wherein image data from the image sensing units meeting a first condition in a k-th column of the image sensing unit array is summed in the k-th buffer region of the first buffer row; and
   wherein image data from image sensing units meeting as second condition in the k-th column of the image sensing unit array is summed in the k-th buffer region of the second buffer row,
   wherein a number of the buffer rows of the buffer is smaller than M.

2. The image sensor of claim 1, wherein the first condition is that the image sensing units are image sensing units of the k-th column of the image sensing unit array.

3. The image sensor of claim 1, wherein the second condition is that the image data are from image sensing units having brightness values over a first threshold in the k-th column.

4. The image sensor of claim 1, wherein the first condition is that the image sensing units are image sensing units of odd columns of the image sensing unit array, and the second condition is that the image sensing units are image sensing units of even columns of the image sensing unit array.

5. The image sensor of claim 1, wherein the image sensing unit is a pixel.

* * * * *